April 8, 1924. 1,489,358
L. MILLBERG ET AL
FRONT BUMPER
Filed Nov. 30, 1923
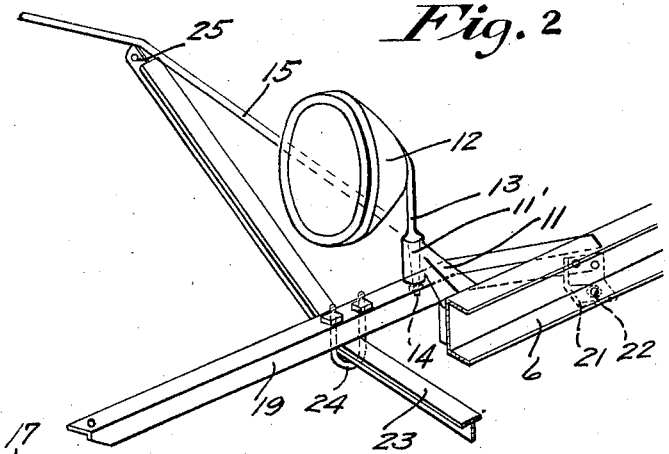
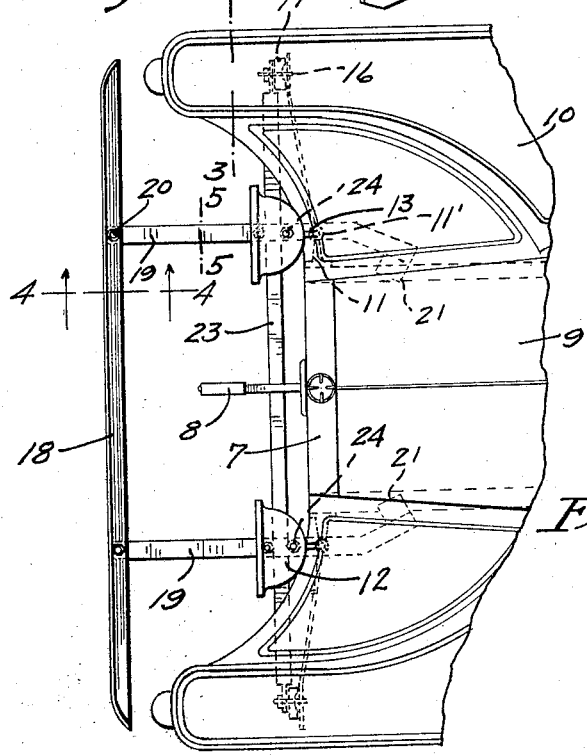
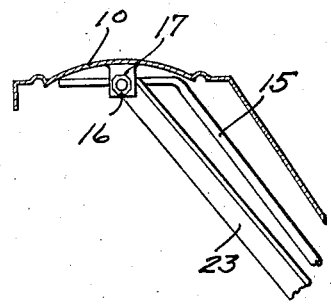
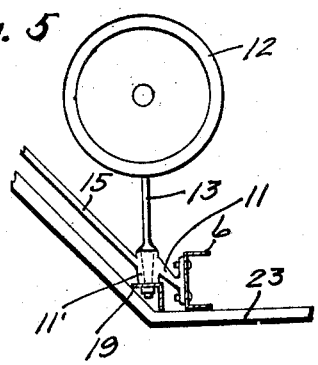
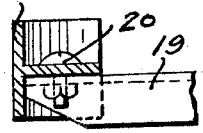
Inventors
Lewis Millberg
Victor Millberg
By their Attorney Patented Apr. 8, 1924.

1,489,358

UNITED STATES PATENT OFFICE.

LEWIS MILLBERG AND VICTOR MILLBERG, OF DASSEL, MINNESOTA.

FRONT BUMPER.

Application filed November 30, 1923. Serial No. 677,654.

*To all whom it may concern:*

Be it known that we, LEWIS MILLBERG and VICTOR MILLBERG, citizens of the United States, residing at Dassel, in the county of Meeker and State of Minnesota, have invented certain new and useful Improvements in Front Bumpers; and we do hereby declare the following to be a full, clear, and exact description of the invention, such as will enable others skilled in the art to which it appertains to make and use the same.

Our present invention has for its particular object the provision of an extremely simple, strong, durable, and highly efficient front bumper and fender brace for automobiles, and to such ends, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view showing the front portion of an automobile of the Ford type, having applied thereto our improved bumper and fender brace;

Fig. 2 is a fragmentary perspective illustrating the manner of connecting the bumper and fender brace to the automobile frame;

Fig. 3 is a detail in transverse vertical section taken approximately on the line 3—3 of Fig. 1;

Fig. 4 is a detail in section on the line 4—4 of Fig. 1; and

Fig. 5 is a transverse vertical section taken on the line 5—5 of Fig. 1.

Of the parts of the automobile, it is only desirable for the purposes of this case to note the longitudinal frame channel beams 6, the radiator 7, starting crank 8, hood 9, fenders 10, lamp-supporting brackets 11, and lamps 12. The brackets 11 are the usual brackets found in Ford cars and are rigidly secured to the front ends of the frame beams 6. The lamps or headlights 12 are provided with the customary supporting stems 13 passed through the sleeve-like outer ends of the brackets 11 and provided at their threaded lower ends with clamping nuts 14. The numeral 15 indicates the fender-supporting rods found in standard Ford cars and which, at their inner ends, are integrally attached to the socket-like outer ends of the brackets 11, and at their outer ends are clamped by nut-equipped bolts 16 to lugs 17 secured on the under sides of the front portions of the fenders 10. The construction so far specifically described is that of a Ford car as turned out from the factory. The fender-supporting rods 15 do not rigidly support the fenders nor prevent vibrations thereof that cause rattling of the fenders and rapid deterioration thereof.

As a front bumper, we preferably use a rolled steel bar 18 that is T-shaped in cross section and the ends of which are slightly rounded. To support this bar 18 in front of the fenders and in position to act as a front bumper, we use a pair of laterally spaced metal bars 19, preferably angle bars, the front ends of which are connected to the horizontal flange of the bumper, preferably by nut-equipped bolts 20, and the rear ends of which bars are riveted to the metallic angle brackets 21, which, in turn, are rigidly secured to the bottom flanges of the frame beams 6 by nut-equipped bolts 22. The rear end portions of the fender-supporting bars 19 are slightly bent laterally so that the horizontal webs of said bars 19 are passed directly under the sleeve-like outer ends 11' of the brackets 11. The horizontal webs of the bars 19 are perforated so that the threaded lower ends of the lamp-supporting stems 13 may be passed downward through said webs when the nuts thereof are removed, and then, when the nuts are re-applied to the threaded ends of said stems 13 below the horizontal webs of the bars 19, the latter will be rigidly anchored and supported by the brackets 11 at points considerably in front of the rear end anchoring brackets 21. Thus, the bars 19 are by very inexpensive and simple means rigidly attached to the automobile framework.

The means for reinforcing and more rigidly supporting the fenders 10 is afforded by a cross bar 23 preferably a rolled steel bar that is T-shaped in cross section. The intermediate portion of this bar 23 is horizontally disposed, is passed directly under the fender-supporting bars 19 forward of the brackets 11, and is rigidly clamped to said bars 19 by nut-equipped U-bolts 24. These U-bolts 24 embrace the cross bar 23 and their threaded nut-equipped upper ends are passed through perforations in the horizontal flanges of the bars 19. Outward of the bars 19, the ends of the cross bar 23 are obliquely extended upward and, at their extreme upper ends, the stop flange thereof is cut away so as to leave projecting end webs 25 that are perforated, so that the nut-equipped bolts 16 are passed therethrough. When the nuts of the bolts 16 are placed outward of the said end webs 25, not only will the original fender brace rods but also the ends of the fender brace bar 23 will be rigidly clamped to the lugs 17 on the under sides of the fenders. The fender-bracing bar 23 is very rigid as compared with the rods 15 and, moreover, they cooperate with the latter to form a sort of a truss for supporting the fenders.

The device above described has been commercially made and put on the market and found to be a highly satisfactory device for supporting a bumper and for independently reinforcing the fenders.

What we claim is:

1. The combination with a vehicle frame and fenders, of laterally spaced bars secured to the sides of said frame and projecting in front thereof, a bumper supported by the front ends of said bars, and a transverse bar rigidly secured to the intermediate portions of said laterally spaced bars and extending beyond the same and having its ends attached to the fenders of said vehicle.

2. A vehicle comprising a frame, fenders and fender braces extended from said frame to said fenders, in combination with laterally spaced bars rigidly secured to the sides of said frame and projecting in front thereof, a bumper secured to the front ends of said laterally spaced bars, and a transverse brace bar rigidly secured to the intermediate portions of said laterally spaced bars and having ends projecting outward thereof and extended upwardly and attached to said fenders, said first noted fender braces and the end portions of said brace bar extending on different lines and thereby affording a truss.

3. A vehicle comprising a frame, fenders and fender braces extended from said frame to said fenders, in combination with laterally spaced bars rigidly secured to the sides of said frame and projecting in front thereof, a bumper secured to the front ends of said laterally spaced bars, and a transverse brace bar rigidly secured to the intermediate portions of said laterally spaced bars and having ends projecting outward thereof and extended upwardly and attached to said fenders, said first noted fender braces and the outer end portions of said brace bar being attached to said fenders at approximately the same point but extended on inwardly diverging lines and affording a truss.

4. The structure defined in claim 3 in which said fenders are provided on their under surfaces with depending lugs and in which the outer ends of said brace and brace bar are rigidly connected to said lugs by nut-equipped bolts.

In testimony whereof we affix our signatures.

LEWIS MILLBERG.
VICTOR MILLBERG.